(12) United States Patent
Hayes-Roth

(10) Patent No.: US 7,376,652 B2
(45) Date of Patent: May 20, 2008

(54) PERSONAL PORTAL AND SECURE INFORMATION EXCHANGE

(75) Inventor: Frederick Hayes-Roth, Atherton, CA (US)

(73) Assignee: The Hayes-Roth Family Trust, Atherton, CA (US)

( * ) Notice: Subject to any disclaimer, the term of this patent is extended or adjusted under 35 U.S.C. 154(b) by 522 days.

(21) Appl. No.: 10/464,065

(22) Filed: Jun. 17, 2003

(65) Prior Publication Data

US 2004/0267707 A1 Dec. 30, 2004

(51) Int. Cl.
*G06F 17/30* (2006.01)

(52) U.S. Cl. .............................. 707/9; 707/2; 715/742; 726/2

(58) Field of Classification Search ................ 707/1–5, 707/100, 9, 10, 104.1; 715/742; 709/203, 709/217, 227, 225; 726/2, 4, 27–30; 713/182, 713/189, 190
See application file for complete search history.

(56) References Cited

U.S. PATENT DOCUMENTS

| | | | |
|---|---|---|---|
| 6,029,175 A | | 2/2000 | Chow et al. ................ 707/104 |
| 6,058,383 A * | | 5/2000 | Narasimhalu et al. ........ 705/44 |
| 6,278,994 B1 * | | 8/2001 | Fuh et al. ...................... 707/4 |
| 2002/0004783 A1 | | 1/2002 | Paltenghe et al. ............ 705/41 |
| 2002/0111934 A1 * | | 8/2002 | Narayan ........................ 707/1 |
| 2002/0116386 A1 * | | 8/2002 | Fabri et al. ................. 707/100 |
| 2002/0165846 A1 * | | 11/2002 | Richer et al. .................. 707/1 |
| 2003/0208507 A1 * | | 11/2003 | Venkatram ............... 707/104.1 |
| 2003/0233425 A1 * | | 12/2003 | Lyons et al. ................. 709/217 |
| 2004/0122730 A1 * | | 6/2004 | Tucciarone et al. ........... 705/14 |
| 2004/0177110 A1 * | | 9/2004 | Rounthwaite et al. ...... 709/202 |
| 2004/0181581 A1 * | | 9/2004 | Kosco ........................ 709/206 |
| 2004/0210640 A1 * | | 10/2004 | Chadwick et al. .......... 709/207 |
| 2004/0236838 A1 * | | 11/2004 | Tout ............................ 709/207 |

(Continued)

OTHER PUBLICATIONS

Drummond Reed et al., "User Managed Privacy, A New Approach for Addressing Digital Privacy and Personal Information on the Internet," retrieved on Apr. 16, 2002. Retrieved from the internet: <URL: http://www.wave.com/technology /privacy WhitePaper.pdf>.

*Primary Examiner*—Cheryl Lewis
(74) *Attorney, Agent, or Firm*—Lumen Intellectual Property Services, Inc.

(57) ABSTRACT

The present invention provides a secure information exchange mechanism that can be seen as a portal or gateway to his or her digital information. The invention is sometimes referred to as an "n-by-m lockbox" because it allows n suppliers to submit information accessible by m accessors. Each lockbox owner specifies and controls who or what can provide what information to the lockbox, who or what can access what information stored therein, and when and how the stored information is accessed. The information may be encrypted and only authorized accessors would be able to decipher it. The lockbox may comprise multiple compartments that segregate information based on pertinent criteria and may incorporate multiple encryption/decryption mechanisms that respectively correspond to each of the multiple compartments. The lockbox owner may associate different encryption keys with different compartments and give these keys to different depositors or instruct depositors to utilize different keys for specific categories of content. The lockbox provides a means for improved organization of the storage of potentially vast amounts of information. Further, the lockbox solves many problems associated with spamming and also advantageously prevents problems associated with various security attacks, such as flooding and denial of service.

55 Claims, 1 Drawing Sheet

U.S. PATENT DOCUMENTS

2004/0260922 A1* 12/2004 Goodman et al. .......... 713/154
2005/0022008 A1* 1/2005 Goodman et al. .......... 713/201
2005/0188045 A1* 8/2005 Katsikas .................... 709/206
2006/0031303 A1* 2/2006 Pang ......................... 709/206

* cited by examiner

PERSONAL PORTAL AND SECURE INFORMATION EXCHANGE

BACKGROUND OF THE INVENTION

1. Field of the Invention

This invention relates generally to information exchange in a network environment. More particularly, it relates to a secure information exchange mechanism, system and architecture where a personal "lockbox" allows n suppliers of information to submit desired information that can be accessed in m different ways.

2. Description of the Related Art

With the growth of information sources, networks, and devices for accessing information, individuals like us find it increasingly difficult to receive only the information we want. Many computer programs and systems make it easy for producers of information to cause that information to reach individuals regardless whether the information is desirable. For example, marketers create and send unwanted electronic mails to virtually any email accounts they can get their hands on. This type of unwanted emails is called "spam." As we adopt additional information appliances, or so-called Internet appliances, such as mobile phones, personal digital assistance (PDA) devices, and wireless network devices we will be accessing information sources, such as email, in more places and more often. Concurrently, as more companies and marketers bring their information to the marketplace, they will be generating additional content, some of which will be unwanted. Without some capability for an individual to strictly control or filter out unwanted information per that individual's needs and wants, the information economy will be severely impacted.

Currently, there are many commercial products that provide, to a certain degree, individualized or personalized access to information on the World Wide Web. Typically, a computer user may customize a "home page" that may include some categories of information in which the user has expressed interest as well as some information mandated by the supplier of the web page. The customization of each user's home page is limited to what is selectively provided by the supplier's server. For example, web portals such as Yahoo! allow users to customize their individual home pages with templates selected from a much larger amount of available stored information. The user typically views and accesses his or her home page through a web browser. The data for each home page may be stored locally on the user's computer for later retrieval if the user explicitly executes a save command. Using today's technology and with many tedious manual operations, a computer-savvy user could create a variety of personalized pages, follow the embedded URLs thereof to access more detailed content referred to by the embedded URLs, create a number of distinct subdirectories, select and store all pertinent information from a type of provider and of a particular category in a distinct subdirectory on the user's own computer system. In other words, it is possible to manually creating a repository of all and only the desired information, stored in appropriate compartments. However, such manual operation is undesirably time consuming and requires computer knowledge beyond ordinary. Moreover, until all relevant information had been accessed, filtered, separated, and stored on the user's computer, the user would be relying on the remote storage of information and several intermediary services provided by the web host and the web page-composer.

SUMMARY

The present invention begins with a focus on how each individual user can simplify the fundamental administrative tasks of managing his or her digital information. A viable solution disclosed herein is to enable each user to specify the permissions on who may supply information (hereinafter referred to as the "authorized depositors"), what information may be received and stored upon receipt (hereinafter referred to as the "desired information"), what information may be accessed, and by whom or what (hereinafter referred to as the "permitted accessors"). The present invention further enables an individual to determine how the desired information is encrypted, such that information can be exchanged at an acceptable secure level.

The secure information exchange mechanism disclosed herein can be seen as a personal portal, or gateway, to his or her digital information. The invention is sometimes referred to as an "n-by-m lockbox" because it allows n suppliers of information to submit information that can be accessed in m different ways. The lockbox assures that no information other than that authorized can enter the lockbox. The lockbox provides ways for an authorized user or permitted accessor, which may be a human or a machine, to access information using "pull" techniques and also provides means for "pushing" information to the accessor as appropriate. In this application, accessor is one who has permission or authority from the owner to access the owner's lockbox. As one skilled in the art would appreciate, such permission can be determined in many ways. Thus, a permitted accessor can be characterized as a qualified or approved accessor, depending upon time, logic, and procedures, etc.

According to an aspect of the invention, the lockbox provides a solution to the problem of spamming, when it is used to store email messages. More generally, the lockbox allows only approved information suppliers or authorized depositors, which may also be humans or machines, to provide information that each owner of the lockbox has deemed acceptable or desired. That is, each individual can control who or what can provide what information to his or her personal lockbox, who or what can access what information stored in the lockbox, and when and how the stored information is actually accessed. The stored information may be encrypted such that only the owner of the lockbox and others authorized by the owner would be able to decipher the encrypted information. On the other hand, the lockbox poses no limit on how desired information should be supplied thereto. Authorized depositors may supply desired information in many ways over various networks and platforms.

According to an aspect of the present invention, the personal lockbox stores, in appropriate compartments, only the desired information, without the need of manual operations and/or intermediating services. Such a capability could be physically possessed locally on the premises or be provided remotely. In some embodiments, a single physical server with storage could provide the functionality of multiple lockboxes owned and controlled by a plurality of individuals; e.g., a home computer could be implemented with multiple lockboxes for multiple family members, each having his or her own personal lockbox.

The present invention provides personalized total control over which providers can deposit what information for each individual in accordance with that particular individual's specification. In a sense, each individual possesses, administers, and controls his or her personal lockbox, a repository of all digital information desired from a wide variety of authorized depositors and accessible by a number of users in many ways. In contrast with database management systems wherein one single administrator sets up access controls for all depositors and accessors, the present invention anticipates a large number of personal lockboxes, each controlled by its individual owner. Thus, the lockbox requires the notion of many administrators, with many possible data stores, for many possible users, with distinct sets of writers, who must satisfy distinct sets of specifications in order to be permitted to make deposits of information.

An object of the invention is to make it easy for each owner to control and access his or her personal lockbox, to enable the owner of the lockbox to inform depositors about how to make deposits in the appropriate lockbox or lockbox compartment, and to achieve a high level of assurance that desired information is appropriately and correctly deposited. Another object is to make it possible for a wide variety of, virtually unlimited, data types to be deposited into the lockbox. Exemplary data types include text, audio, video, images, etc. In an embodiment, the present invention handles a diversity of data types by, for example, associating distinct file type extensions with each kind of data type stored in a file within the lockbox.

According to an aspect of the invention, every transmittal of information accords with specifications on what is permissible. For instance, from a supplier to a recipient, the recipient receives all and only the information the recipient had previously specified to be acceptable. The specification of what information should flow can be formulated (by type, semantics, or other attributes) by the recipient, by the supplier, or by a conjunction of the two. Information that should not be transmitted will not be accepted or stored. Thus, information with no value will be barred admission. Once desired information is stored, any variety of query and access mechanisms may be employed in support of the individual interests against the personal information stores created for him or her. In addition, the owner of the lockbox may further organize the stored information by utilizing multiple compartments that segregate information based on pertinent criteria. For example, the lockbox owner may associate different encryption keys with different compartments and give these keys to different sets of depositors or instruct depositors to utilize different keys for specific categories of content. This way, the lockbox would provide a means for improved organization of the storage of potentially vast amounts of information.

The secure information exchange mechanism disclosed herein also assures that all information that should reach a recipient does so. In an embodiment, the lockbox is an assured information exchange implemented with a secure computing system with assured operations and assured message delivery.

Still further objects and advantages of the present invention will become apparent to one of ordinary skill in the art upon reading and understanding the drawings and detailed description of the preferred embodiments disclosed herein.

DETAILED DESCRIPTION

Figure 1:
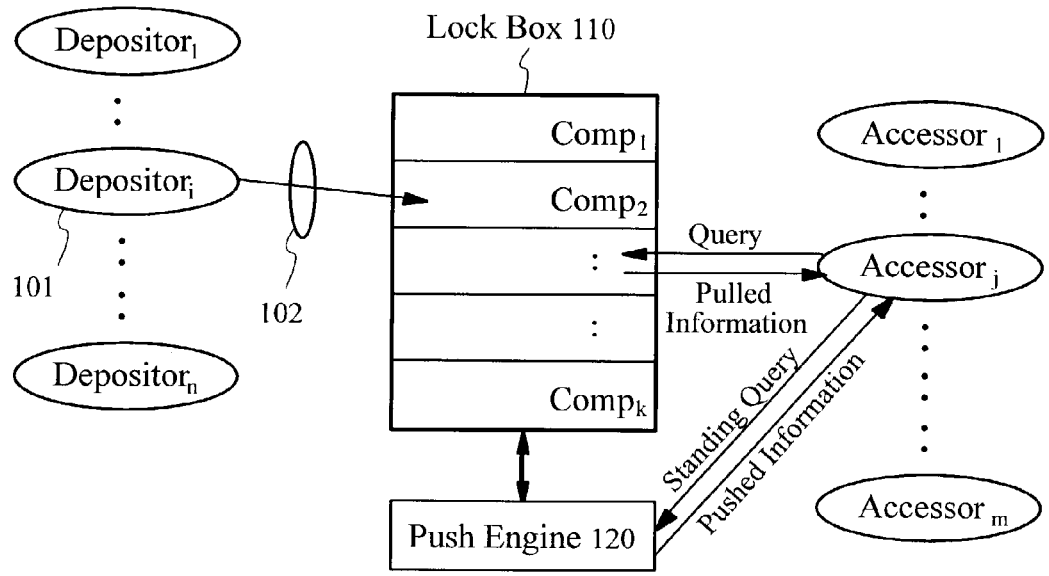
FIG. 1 depicts the principal elements of the lockbox system and architecture.
Figure 2:
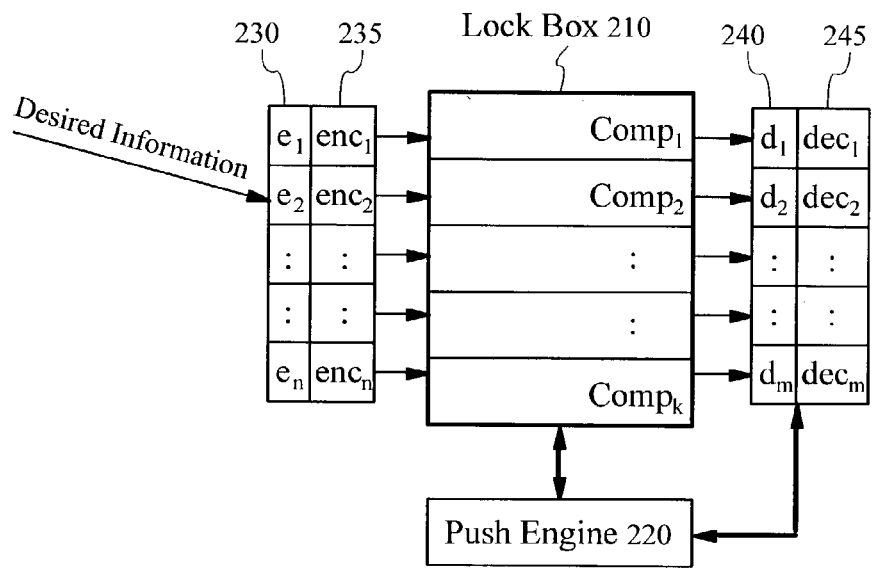
FIG. 2 shows an embodiment of the lockbox implemented with enciphering and deciphering mechanisms.

Various existing technologies could be employed in novel combinations to provide the lockbox functions. For example, email servers could be augmented with filters that would prohibit undesired senders from reaching recipients. Using currently available means, however, this is difficult to do. Today, email is typically stored in POP servers, in a separate file for each intended recipient, corresponding to the email address of the recipient. The recipient then employs a client program to access the stored email and may, at that time, employ additional programs to filter out mail from undesired senders or which may have some content matching an objectionable feature. In this way, email from known pornography sites might be routed directly to a discard file. But email POP servers may be deluged with too many messages or too voluminous attachments, causing the mail server to exceed its capacity limits. Moreover, there is no way for users to specify to the server which senders to admit and which to bar from making deposits to the POP server received mail file.

With some novel modes of use, database systems might also be employed to implement lockbox functions. Typically, database management systems allow authorized users to create and update databases and allow additional users to read some of the database elements or files. Databases also provide query languages for users to access specified data. Some databases even provide means for accepting standing queries that are periodically checked against existing and changed data. Today, however, there is no way for the intended recipient of data to specify which people may make deposits of information or what kinds of information they can deposit. Further, there is no way for depositors of information to specify which users may access that information. This is because all privileges for databases are governed by database administrators who can assign read or update privileges to users, tying these in an all-or-none way to the database. Databases are usually employed with a small number of writers and a large number of readers, where the intended purpose is to provide the same information to all users.

Likewise, with some novel modes of use, file systems might also be employed to implement lockbox functions. Typically, file systems are organized into hierarchies and users are similarly grouped into hierarchies. Administrators specify which subtrees of the file system hierarchies may be read or written by which groups of users. This way, multiple writers could be permitted to create files that multiple readers could access. However, it would be extremely difficult to administer a system where individual users could specify which suppliers could deposit information for them. Each user would need administrator privileges, and all users and depositors would need to be known to the operating system (as with individual user logins). Moreover, to support different categories or groupings of depositors, of deposited information, or recipients, would require these user logins to participate in multiple groups and for the files to be organized in multiple ways. Strict hierarchies would not be suitable. The problems of trying to maintain multiple groupings and multiple permissions would be difficult even for a single user. With multiple users, the problems would quickly prove intractable with current file system administration techniques.

The personal secure information exchange mechanism and system according to the present invention provides an efficient and surprisingly easy way for multiple depositors to store personally desired information accessible by multiple users without compromising security or performance. FIG. 1 depicts the principal elements of the lockbox architecture 100. In this embodiment, the lockbox 110 is configured with multiple compartments ($Comp_1$~$Comp_k$) to segregate all kinds of information, e.g., information from different sources, information of different semantic categories, or information deposited by different depositors ($Depositor_1$~$Depositor_n$).

Before a depositor, e.g., $Depositor_i$, may make a deposit, the lockbox 110 determines whether $Depositor_i$ is authorized to make deposits. In this embodiment, the oval shaped admission process 101 makes such determination in accordance with the owner's specification. The admission process or, in this case, authorized depositor filter 101 may check the company affiliation of $Depositor_i$ against a list of authorized information suppliers, granting permission to make deposits if $Depositor_i$ is on the list and barring if not. As another example, individual names, identities, or some other properties or attributes of depositors might be compared to lists of permitted individuals, or a list of barred individuals might be checked. In any case, a depositor's deposit is barred if the depositor fails filter 101.

In a specific example, the owner of the lockbox 110 might specify "Deposits are acceptable from Bank of America." Alternatively, the owner might specify "Deposits are acceptable from any company which is included in the file named mySuppliers.txt." In yet another example, the owner might specify "Deposits are not allowed from any company on the list in file spammersList.txt." The owner might, in general, provide the address of a decision procedure that would decide whether a specific depositor should be allowed or disallowed from making a deposit at the time the decision procedure is invoked.

Additionally, a deposit is barred if it does not satisfy content permission filter 102. In accordance with the owner's specification, the filter 102 checks a list of types of permitted or barred content characterized in a variety of ways. For example, excessively long deposits may be barred because they exceed a maximum file size specification. As another example, content that includes prohibited words or images might be barred. As yet another example, financial statements from an authorized depositor such as a bank might be allowed, whereas advertisements, solicitations, and newsletters from the same bank might be prohibited.

The owner specifies attributes of candidate information deposits that determine whether the deposits will be acceptable or not. For example, the owner might specify "The maximum acceptable file size is 10 megabytes." Alternatively, the owner might specify "No files that contain pornography are acceptable" or "Any file that contains my social security number is acceptable." The owner might provide the address of a decision procedure that would decide whether the candidate deposit should be allowed or disallowed. For example, a procedure called Check_for_red_flag_words(textfile T) might be used to evaluate a text file for the presence of unacceptable words, and one class of procedures could be used to permit deposits while another could be used to disallow deposits. The content of information might be evaluated in numerous ways, including the type of information (such as its MIME type or file extension or other attributes described in XML), its actual semantic content (such as facts or rules it contains), or its physical properties (such as size, physical encoding), among others.

The owner of the lockbox may specify that the lockbox should be partitioned into multiple compartments, with each compartment being used to store information of one class. Such a partition could be used to associate particular depositors with particular compartments, particular types of content with corresponding compartments, or particular accessors with particular compartments. In this way, the owner can organize the information store in ways intended to simplify its use. For example, the owner could specify "Deposits from Bank of America should be placed in $Comp_1$," or "Bank statements should be placed in $Comp_2$," or "Files containing red flag words (as determined by Check_for_red_flag_words") should be placed in $Comp_k$." When deposits are deemed acceptable according to criteria on depositors and content, they are stored in compartments consistent with these specifications.

In short, the lockbox 110 permits desired content to be stored, but does not store information deposits that fail the authorization and permission filters 101, 102. Thus, the lockbox 110 solves many problems associated with spamming although the lockbox is in no way restricted to email storage applications. According to an aspect of the invention, the lockbox 110 also advantageously prevents problems associated with various security attacks, such as ones based on overflowing storage or denying service by overloading the storage server.

The permitted deposits of information and authorized accesses from $Accessor_1$~$Accessor_m$ to the deposited information can be done by pull or push mechanisms, or as a combination of the two. For example, as shown in FIG. 1, information is pulled from the lockbox 110 when it satisfies a query conveyed from $Accessor_j$. The query may be as simple as "give me all information in the compartment" or "give me any information I have not previously accessed." The query might be expressed in some query language, such as a database query language such as SQL, a natural language expression, or some formal logic expression (e.g., a Prolog goal expression). The lockbox can be easily implemented to employ whatever query languages and query processors are available.

As an alternative, $Accessor_j$ may pose standing queries that the lockbox 110 evaluates from time to time, generally either on a scheduled basis or in response to changes in its stored content. In this embodiment, the lockbox 110 utilizes a push engine 120 to provide information that satisfies standing queries to $Accessor_j$. The push engine 120 examines the content relevant to the standing query and produces an appropriate response. The push engine 120 then utilizes any of a variety of mechanisms to send the responsive information to $Accessor_j$ directly or to other servers or devices that $Accessor_j$ has designated for receiving that information.

In general, each user accesses his or her lockbox through devices of his or her choice and over networks that can link the chosen device to the lockbox. For example, the user might access the lockbox 110 from a desktop computer, linked to the Internet, when the lockbox 110 provides an Internet-enabled access protocol, such as http (hypertext transfer protocol) or ftp (file transfer protocol). Proprietary networks might be used. The lockbox might be incorporated into a more comprehensive system that provides its own special access protocols and routes appropriate queries to the lockbox and routes responses to those queries through various stages ultimately back to the user.

The lockbox is best implemented as a computer application with full administrative privileges on a secure computing platform using a file system to store deposits. The lockbox provides to each supported user the ability for the user to create specifications about depositors, acceptable deposits, accessors, queries, and notification methods. Individual deposits are best stored as files of the appropriate type within a subdirectory corresponding to the compartment of a directory corresponding to the user. The lockbox receives deposits, determines that they are acceptable under the constraints on depositors, deposit attributes, and information attributes, and then stores them as a file within the appropriate subdirectory. In some cases, deposits might consist of multiple objects or compound objects that might require creating a corresponding compound file structure. The simplest way to store these is as elements of a subsubdirectory, with one file that defines the structure of the constituents and as many files (or subsubsubdirectories) as there are constituent objects (or constituent compound objects).

The lockbox can provide additional levels of security by use of encryption. Specifically, owners and depositors can agree on an encryption system and exchange keys so that the deposited information can be encrypted using an encryption key and encryption algorithm and then deciphered with the corresponding decryption key and decryption algorithm. Any such algorithms and associated key mechanisms can be employed.

Moreover, each depositor may utilize multiple enciphering/deciphering keys $230$, $240$ and encryption/decryption mechanisms $235$, $245$ that correspond to particular compartments of the lockbox $220$, as shown in FIG. $2$, which illustrates the lockbox system $200$. For example, an authorized depositor (not shown) encrypts desired information with an enciphering key $e_2$ of enciphering mechanism $enc_2$. The lockbox $210$ is configured with multiple compartments $Comp_1$~$Comp_k$ and implemented with push engine $220$. The desired information is deposited in compartment $Comp_2$. Upon satisfying a query from an accessor (not shown), the deposited information is deciphered using an appropriate deciphering key $d_2$ of deciphering mechanism $dec_2$. The enciphering and deciphering mechanisms $235$, $245$ may be implemented by the lockbox $220$ itself or may be implemented by other mechanisms accessible to the depositors and owners, respectively. Similarly, the enciphering and deciphering keys $230$, $240$ may be stored in the lockbox $220$ or stored in some other secure storage facility.

One preferred means of providing encryption employs public key cryptosystems. In this case, the owner/user provides a digital key to a supplier/depositor with instructions to encrypt deposits using the key. When the encrypted deposit is received, the user employs a corresponding key to decipher the information. If the user trusts the supplier to provide only acceptable contents, the information may be stored immediately in the appropriate compartment without additional processing. If the user wishes to check the depositor's credentials or the type of content of the deposit, the user can decipher the deposit using the corresponding deciphering key to convert the deposit and meta-information into plain text for analysis. The information, once approved for storage, can be encrypted using the depositor's key or another key known to the user. When the user wishes deposits from multiple depositors to be stored in the same compartment, those depositors can be given the same key to use for encryption. Thus keys can be associated with compartments. This means can be employed to associate content of a particular class with a compartment and to use a single key for encryption.

A well known advantage of public key cryptosystems is that the enciphering (public) key need not be protected. Access to the enciphering key does not enable others to decipher encrypted information. This means that enciphering keys can be transmitted electronically, over public or private networks, and furnished to depositors whether or not they maintain the enciphering keys on trusted systems.

The user may allow multiple accessors access to the stored information in one or more compartments. These accessors might be different people or different computer-based access mechanisms with appropriate privileges. When information is encrypted, the user may provide deciphering keys to the accessors. Alternatively, the user might decipher the encrypted information prior to providing it to the accessor.

In some embodiments, the user specifies names of people or computer programs that are permitted to access information. The user might also specify credentials or other attributes of an accessor that must be satisfied before access is given. There are many different ways access may occur and most possibly is through a query. The accessor may request access to "All deposits made by Bank of America," for example. As another example, the accessor may request access to "All deposits that contain the user's social security number." The lockbox is intended to exploit the wide variety of techniques for finding files or objects that match various content specifications or meta-data specifications (such as about date or author). Because the lockbox can store information in a database management system (DBMS) when desired, query languages available for those DBMSs would naturally be available. For example, if the user designates compartment $1$ of his lockbox to receive and store receipts of all purchases on his Visa card, compartment $1$ could be stored in a relational table with attributes for purchase date, transaction number, vendor, and transaction total. Then an SQL query could be formulated asking for all receipts for transactions with a particular vendor or for the total of those transactions. Whenever information is supplied in direct response to an accessor's request, this is described as an information "pull." The lockbox can support any type of query by determining which stored information matches the query.

The lockbox can also store and process standing queries. Such queries specify types of information that the accessor wishes to be informed about at some subsequent time. Usually standing queries are "good until cancelled," although they may also specify a specific time period when they are considered active or valid. Standing queries can be recorded and maintained in an inactive state as well, to make it easy for a user to reactivate a potentially complex query when desired.

A variety of well known techniques are available to process standing queries. One technique is to schedule a time when the standing query is evaluated against the contents of the information store. Usually this is done periodically and all instances of information that match the query are provided. When information is provided to accessors on an asynchronous basis, not in immediate response to a query, the information is "pushed," rather than pulled. Other techniques for determining information to push are also well known and readily exploited by the lockbox. One method notices when information in a compartment is changed and immediately evaluates all standing queries that might be affected by the changed information. The response can be to push all the information responsive to the standing query at that time, or can be more selective. Increased selectivity can be achieved by first assuring that the response to the standing query is different subsequent to the information change than it was previously. When the answer to the query is unchanged, there is no new information from the accessor's point of view. Another type of improved selectivity can be achieved by providing only the changed part of the query response to the accessor. For example, if the standing query is "All transactions whose total transaction value exceeds $1000" and one new transaction is deposited for a purchase of a desk from Office Designs with a total cost of $1845, a change-only response to the standing query would report just that new transaction, rather than repetitively reporting all previously reported transactions over $1000.

In some embodiments, pulled information is provided to the calling procedure using some conventional corresponding return mechanism. If the pulling query is expressed via a procedure call or a remote procedure call, for example, the query response is encoded in the return to the procedure. Other protocols and conventions can easily be exploited, as desired.

In some embodiments, pushed information is provided to the end user or the associated accessor by selecting among a plurality of specified notification methods which may include details of communication protocols, data encoding formats, and other information needed to send the response to the recipient's chosen receiving device. For example, an accessor might specify "Send all responses to all standing queries to my email address, xxx_yyy@zzz.com" or might specify "Send all messages less than 1000 bytes to my cell phone at 123-456-7890@cellphonetext.com." The lockbox can support any well-defined method for communicating pushed information to the appropriate recipients.

The lockbox can be used to allow opt-in subscription to information. A user can specify that one compartment be available to deposits of some desired type. Accesses to that type would correspond to receipt of information of the desired type. The compartment's activity could be monitored to support a fee for access. If the fee were based on a time interval, this would implement a time-based subscription to a particular set of depositors, content type, or category, depending on how deposits to the compartment are determined. If fees were to be based on the number, volume, or specific contents of accessed items, this would implement a fee for use or copy type of subscription. Because the lockbox makes it possible for users to deny deposits from undesired depositors or containing undesired information, the user is assured that the lockbox implements the desired opt-in policies. The user gets just what he or she wants, rather than having to store and then filter out undesired deposits.

The lockbox implements trustable, secure channels of communication. In this way, the lockbox functions as an information exchange medium which assures that only appropriate information flows to any recipient. The user can specify which types of information should be deposited to each compartment and how that information is pushed to various accessors. No other information flows from that channel to those accessors. In this way, users can set up channels of communication that assure that all stored and transmitted information satisfies user-specified constraints.

In some embodiments, the lockbox can be implemented to allow depositors determining information flows. For example, the lockbox owner is an employer and different compartments of the lockbox are associated with different categories of employees. The employer would enable suppliers to deposit information intended for various groups of employees in the corresponding compartments. In this way, the employer enables the depositors to determine the flow of information.

In some embodiments, the lockbox system and architecture can be implemented such that both depositors and lockbox owners are permitted to specify restrictions on deposits into compartments or queries that pull information out of compartments. These are straightforward variants of policy in how the basic lockbox mechanisms are employed.

Firewalls are systems that attempt to protect computer systems from unwanted communications from external systems. Firewalls are mostly "stateless" in that they attempt to permit or deny transit of information messages through the firewall to the recipient system. The lockbox advantageously provides many functions of a firewall in that the lockbox can selectively bar admission of undesired information. Unlike conventional firewall systems, however, the lockbox can also function as a personal repository and can store information for later access. In some embodiments, a plurality of lockboxes can be combined in distributed systems, where each precludes undesired information, stores desired information, and forwards information by pushing it in response to standing queries. One anticipated benefit of this type of distributed system is that network operators ultimately might be able to charge depositors a penalty for costs associated with handling rejected deposits, thereby creating a practical disincentive to spamming and disseminating other kinds of undesired information.

The lockbox could provide a personal storage utility for each person. Over time the person could evolve a set of compartments appropriate to different categories of information and develop improved specifications of which depositors and what characteristics of deposits should be stored in each compartment. In this way, each person could potentially control the information glut associated with currently uncontrolled volumes and sources of information. Furthermore, the person could assure that the only information that reached him or his designated accessors was from desired depositors with desired content characteristics. As a further enhancement, the person could employ human or automated agents to seek out additional content that could complement that already stored in a compartment. For example, an agent could be employed to find licensed digital copies of photographs by a particular photographer and to obtain and store copies of those not previously acquired.

The lockbox could be utilized to determine trustworthiness ratings for depositors or for content descriptors based on user feedback. For example, users could authorized storage of "CATEGORY: bank statement" in compartment 1, originally trusting associated meta-data annotations placed on the information by the banks. For example, Bank of America could annotate its monthly statements with the annotation "CATEGORY: Bank Statement," thereby causing its candidate bank statement deposits to be deposited in compartment 1. Another bank, however, might misuse the same type of annotation, perhaps annotating both its bank statements and its weekly newsletters as "CATEGORY: bank statement." The lockbox could provide a feedback rating system, enabling users to "reward" or "punish" depositors based on the reliability of their representations. This could be used to raise or lower ratings of trustworthiness for all suppliers of information and meta-information, including providers of content analyses that claim to accurately describe content attributes of information. In this way, the lockbox enables growth of a marketplace for reliable information, analysis, and meta-information providers, because it makes possible direct feedback on assertions that users employ to receive desired information and avoid receiving undesired information.

The utility of the lockbox may be improved through the use of a hierarchical or semantic or conceptual organization of content categories. For example, news content might be organized at the top level into USA national news v. International News, and below each of these top-level categories a set of second-level categories might include Sports, Business, Politics, Government, Entertainment, Human Interest, and Other. These category systems could be arbitrarily deep or complex. Compartments could be associated with categories and specifications of desired information could employ these categories as meta-information about candidate deposits. Information tagged at a subcategory level would appropriately be placed in the most specific compartment corresponding to the subcategory or a generalization of it. For example, if Cricket were a subcategory of Sports, and a story arrived tagged with the meta-data "Cricket," the lockbox would want to assign that deposit to a compartment corresponding to "Cricket" if available. Otherwise, it would look for a compartment corresponding to the most specific generalization of "Cricket" in the hierarchy, such as "Sports." If a compartment had been assigned to "Sports," the lockbox would assign the deposit on "Cricket" to that compartment. In this way, a conceptual framework could simplify classification of information and assignment to compartments. In addition, if many users employed similar conceptual frameworks, information suppliers, meta-information suppliers, and information recipients would all benefit from evolution and refinement of efficient category frameworks.

The utility of the lockbox may be improved through storage and use of references to content, rather than explicit storage of all content. For example, a depositor might supply a world wide web URL for a document, and the lockbox could store just the URL after determining that the storage of the document satisfies the specifications for acceptability. In this way, storage volume requirements would be reduced. Storage of meta-information along with references might also be desirable, because in this way both the reference and the characteristics of the information would be immediately available for query processing.

Another improvement in the lockbox would result from use of polymorphic categories, where a single information object could be classified in multiple ways and possibly stored in multiple compartments. For example, a photograph of Tom and Susan might be stored in a compartment corresponding to photos of Tom and also in a compartment corresponding to photos of Susan. Combining polymorphic categories with storage by reference, the lockbox can achieve great reductions in storage requirements.

Another improvement would be through the use of category logic, whereby the categories used to describe content are expanded through the application of rules. For example, logic rules such as "Tom is an adult," and "Susan is a child," could permit a photo of Tom to be placed in the compartment created for photos of Adults and the photo of Susan to be placed in the compartment associated with photos of Children. Rules of these sorts can be represented in any expert system tool such as M.1 or logic programming language such as Prolog, and inferences could be computed using those language system interpreters. In this way, the lockbox could exploit available logic programming technologies to apply rules of logic to determine content categories or other content attributes and could also use such rules to determine assignments to compartments. Different policies could be employed to determine who could create or specify such rules and when the lockbox should execute them in doing its basic functions of determining whether deposits are allowable, where they should be stored, how they satisfy queries, and how responses to queries should be effectuated.

Rules of the sort previously described can be utilized to specify and implement side effects. This would be useful, for example, in removing redundant or superseded or expired deposits. For example, a compartment for employee photographs could remove any old photograph of a specific employee whenever a newer one is deposited.

Rules of the sort previously described could be utilized to simplify categorization of depositors or other attributes of them. For example, each specific bank could be associated with a rule that asserts it is "a bank" and another rule could assert "every bank is a financial institution," so that deposits from all banks and savings and loans might be stored in a compartment associated with financial institutions. This type of rule, for example, would be useful in allowing the user to specify that monthly statements from all financial institutions should be assigned to a particular compartment.

Many alternative implementations and embodiments of the lockbox are possible beyond that preferred embodiment described here. For example, a lockbox could be implemented as a networked appliance, where each user might own one or more such appliance. The appliance would then be used to receive desired information and store and forward such desired information to the user's various chosen devices or to forward them to the user's preferred access systems. One appliance might serve all members of a family, for example, and be associated with the family's residence. Multiple appliances might serve each user, providing local access points in different sites and providing redundancy where desired. Alternatively, one appliance or multiple appliances could serve an entire company or enterprise.

The logical and physical storage of the lockbox could be implemented in a variety of ways, including but not limited to file systems, with one file per deposit or with multiple deposits per file. Deposits of different types would best be stored in distinct types of files, permitting each file to be interpreted and queried by an application of the corresponding sort. However, in some cases, different types of objects could be stored in one file if required. The deposits could be stored in one or more database management systems. The deposits could be stored in various physical storage systems, including disks, compact disks, tapes, or other physical memory systems.

The specifications could be provided in any of a variety of ways. Depositors, credentials, and deposit privileges could be specified using a formal notation, an informal notation, natural language, or a structured syntax such as XML. Information content and meta-data could be similarly specified. Accessors, queries, notification mechanisms, and responses to queries could also be similarly specified and encoded in a wide variety of language and notation systems. The lockbox functions as a means for assuring that desired information is accepted, deposited, and available for query and access, while denying admission and rejecting deposits not specified as being desired. Any suitable means of expression of these specifications would be feasible.

Many different means of encrypting information are available. In addition to public-key cryptosystems, private key systems can be used such as those specified by the former National Bureau of Standards. Encryption can be done before deposits are submitted as a preprocess for the lockbox or by the lockbox system itself, either in the same computer or in a distributed component of the system. Similarly, encrypted information can be deciphered in a variety of ways and at different times and locations, ranging from before information is removed from the lockbox to after the information is received.

A variety of semantic classification schemes can be employed to characterize content and information categories, and these schemes can be used to determine which information may be deposited and to which compartment. Similarly, these schemes can be used to support query and reporting, as desired.

A variety of schemes can be used to describe credentials of depositors and support the specification of acceptable depositors and the determination of whether a deposit is provided by an acceptable depositor. The lockbox also can employ measures of trustworthiness or other indications of reliability, including as descriptors of depositors and as meta-data either about the depositor, the depositor's credentials, or the characterization of the content or type of the information to be deposited. The lockbox can accept feedback from users on the validity or accuracy of such information, thereby enabling and participating in a marketplace of information whereby depositors and meta-data are rated for validity and accuracy as well as degrees of trustworthiness and reliability. More specifically, trustworthiness can be affected/evaluated by each type of category of information supplied to the lockbox; e.g., whether a supplier correctly lists the category of information. Additionally, determination of trustworthiness can depend on actual assertions (content) carried within each type of category. Last but not least, trustworthiness should depend on whether the supplier fully and correctly discloses important/material features of the information in each category. For instance, if one category is "Contains advertisements, yes or no?" then a full and complete disclosure would list the nature of each contained advertisement. Such full and complete disclosure raises an estimate of trustworthiness. Note "category of information" might be carried down, recursively, to a set of questions that correspond to each lowest level detail. Thus, following the previous example, a low level category might be "Contains obnoxious Bud Light beer commercial, yes or no?" A goal here is to be able to get down to the level of information disclosure that users specify they are concerned about and then hold depositors accountable for full disclosure consistent with those concerns.

The lockbox can support a variety of accounting and payment systems, whereby depositors, users, or accessors are credited or debited based on subscriptions, storage, queries, notifications, and accesses.

In sum, the lockbox provides a means for a user to create a controlled, hierarchical and polymorphic repository where the user can control and assure who can make deposits and who can access stored information. This can open the way to a highly expanded commercial marketplace for content, because each user can govern who supplies him or her with what content and, in turn, which content he or she provides access to. With push and pull engines, the lockbox can provide store and forward, publish and subscribe capabilities, among others. As discussed heretofore, in the past storage was provided and managed in gross and primitive ways that required users to have different stores in different localities, using different devices, and requiring different access protocols. The lockbox of the present invention can provide a unifying storage utility for each user, intelligently aggregating, filtering, categorizing, caching and forwarding appropriate content to each user's designated accessors. In this way, the lockbox can be a permanent, versatile switchboard and warehouse for each user, and it can provide persistent personal storage that can be adaptively managed over long periods of time. New devices can come and go; new suppliers of information can come and go. The lockbox according to the present invention can provide a stable architectural component for these ever-changing array of devices and suppliers, in addition to enabling them to be linked through a secure information exchange that assures all and only desired information flows to recipients.

Although the present invention and its advantages have been described in detail, it should be understood that the present invention is not limited to or defined by what is shown or described herein. Known methods, systems, or components may be discussed without giving details, so to avoid obscuring the principles of the invention. As it will be appreciated by one of ordinary skill in the art, various changes, substitutions, and alternations could be made or otherwise implemented without departing from the principles of the present invention. As such, the drawings are for purposes of illustrating a preferred embodiment(s) of the present invention and are not to be construed as limiting the present invention. Accordingly, the scope of the invention should be determined by the following claims and their legal equivalents.

What is claimed is:

1. A computer-implemented secure information exchange system comprising:
   a digital repository, wherein said digital repository is a personal digital repository having a digital lockbox, wherein said digital repository comprises:
      means for permitting multiple and different authorized suppliers to only push desired information to the digital repository, in which the multiple and different authorized suppliers are humans or machines, and wherein the desired information is specified by the owner of the digital repository as the information to be received by and stored on the digital repository;
      means for storing the desired information on the digital repository once the desired information has been pushed and accepted as the desired information by the digital repository;
      means for allowing multiple and different permitted accessors, in which the permitted accessors are humans or machines including the owner of the digital repository, access to the desired information stored on the digital repository; and
      a plurality of compartments and a means for specifying which of the plurality of compartments is accessible by which of the multiple and different permitted accessors; and
   means for encrypting the desired information.

2. The secure information exchange system according to claim 1, further comprising:
   means for preventing undesirable information being stored in the digital repository, wherein the undesired information is specified by the owner of the digital repository as the information to not be received by and not stored on the digital repository.

3. The secure information exchange system according to claim 2, in which the means for preventing undesirable information being stored in the digital repository is a content permission filter.

4. The secure information exchange system according to claim 1, further comprising:
   means for preventing undesirable information being supplied to the digital repository.

5. The secure information exchange system according to claim 1, wherein
   the digital repository is configured with a plurality of compartments.

6. The secure information exchange system according to claim 5, wherein
   each of the plurality of compartments stores a category of the desired information.

7. The secure information exchange system according to claim 5, wherein
each of the plurality of compartments is accessible by at least one designated permitted accessor.

8. The secure information exchange system according to claim 1, wherein
the digital repository resides in a highly secure computer server and works in concert with a security means for high security.

9. The secure information exchange system according to claim 1,
the digital repository resides in network compliant device.

10. The secure information exchange system according to claim 1, further comprising:
a plurality of enciphering keys.

11. The secure information exchange system according to claim 10, wherein
each of the plurality of enciphering keys corresponds to a distinct authorized supplier.

12. The secure information exchange system according to claim 10, wherein
each of the plurality of enciphering keys is associated with one of a plurality of categories of desired information.

13. The secure information exchange system according to claim 10, wherein
each of the plurality of enciphering keys is associated with one of a plurality of compartments of the digital repository.

14. The secure information exchange system according to claim 10, wherein
the plurality of enciphering keys are characterized as public keys.

15. The secure information exchange system according to claim 1, further comprising:
means for decrypting the desired information.

16. The secure information exchange system according to claim 15, further comprising:
a plurality of deciphering keys.

17. The secure information exchange system according to claim 16, wherein
each of the plurality of deciphering keys corresponds to a permitted accessor.

18. The secure information exchange system according to claim 16, further comprising:
means for determining whether the permitted accessor is an authorized supplier permitted to modify the desired information, originally deposited thereby, stored in the digital repository.

19. The secure information exchange system according to claim 16, wherein
each of the plurality of deciphering keys is associated with one of a plurality of categories of desired information.

20. The secure information exchange system according to claim 16, wherein
each of the plurality of deciphering keys is associated with one of a plurality of compartments of the digital repository.

21. The secure information exchange system according to claim 16, wherein
the plurality of deciphering keys are characterized as public keys.

22. The secure information exchange system according to claim 1, further comprising:
a public key encryption means for encrypting and decrypting the desired information.

23. The secure information exchange system according to claim 1, wherein each of the plurality of compartments stores a category of the desired information.

24. The secure information exchange system according to claim 1, further comprising:
means for receiving information including candidate supplier information, candidate accessor information, contents, or a combination thereof.

25. The secure information exchange system according to claim 24, further comprising:
means for determining, based on the candidate supplier information and the specification, whether the candidate supplier is one of the authorized suppliers.

26. The secure information exchange system according to claim 24, further comprising:
means for determining, based on the contents and the specification, whether the contents contain desirable information.

27. The secure information exchange system according to claim 24, wherein
the candidate supplier information includes information related to the candidate supplier's identity, credentials, or both.

28. The secure information exchange system according to claim 24, wherein
the candidate accessor information includes information related to the candidate accessor's identity, credentials, or both.

29. The secure information exchange system according to claim 24, wherein
the contents includes information related to categories or semantics thereof.

30. The secure information exchange system according to claim 1, wherein
the digital repository is configured with a plurality of compartments.

31. The secure information exchange system according to claim 30, further comprising:
means for specifying what each of the plurality of compartments stores.

32. The secure information exchange system according to claim 31, further comprising:
means for enabling the owner of the digital repository to interact with said means for specifying.

33. The secure information exchange system according to claim 1, further comprising:
means for preventing accessors without access permission from accessing the desired information.

34. The secure information exchange system according to claim 1, further comprising:
means for pulling the desired information stored in the digital repository in response to a query.

35. The secure information exchange system according to claim 34, further comprising:
means for evaluating the query.

36. The secure information exchange system according to claim 1, further comprising:
means for evaluating standing queries in response to a change to the desired information stored in the digital repository.

37. The secure information exchange system according to claim 36, further comprising:
means for selecting appropriate standing queries affected by the change for evaluation.

38. The secure information exchange system according to claim 1, further comprising:

means for pushing the desired information stored in the digital repository to at least one permitted accessor.

39. The secure information exchange system according to claim 1, wherein
the digital repository having means for implementing a predetermined notification method.

40. The secure information exchange system according to claim 1, wherein
the digital repository conforms to a predetermined communication protocol.

41. The secure information exchange system according to claim 1, further comprising:
a plurality of distinct digital repositories, each having its own authorized suppliers, permitted accessors, and storage means.

42. The secure information exchange system according to claim 41, further comprising:
means for caching the desired information in more than one digital repository.

43. The secure information exchange system according to claim 41, further comprising:
means for forwarding the desired information from one digital repository to another digital repository, network compliant device, or server over one or more networks employing one or more communication protocols.

44. The secure information exchange system according to claim 43, wherein
each network is characterized as a wired network, a wireless network, or a combination thereof.

45. The secure information exchange system according to claim 1, further comprising:
a computer product for implementing the digital repository, the computer product comprising a computer readable medium carrying computer-executable instructions implementing functions of the digital repository, including interacting with the authorized depositors, the permitted accessors, and the owner.

46. The secure information exchange system according to claim 1, further comprising:
means for enabling the authorized suppliers to specify which of the permitted accessors receives what content of the desired information.

47. The secure information exchange system according to claim 1, further comprising:
means for enabling the permitted accessors to specify the desired information, to specify how the desirable information is accessed, and to specify which of the desired information is to be pushed.

48. The secure information exchange system according to claim 1, further comprising:
means for assuring each of the authorized suppliers that the desired information supplied thereby reaches only those of the permitted accessors that match specifications respectively defined by each of the authorized suppliers.

49. The secure information exchange system according to claim 1, further comprising:
means for assuring each of the permitted accessors receives no other information but all that is available in the digital repository and that satisfies interests respectively specified by the owner or any of the permitted accessors.

50. The secure information exchange system according to claim 1, further comprising:
means for organizing content of the desired information stored in the digital repository.

51. The secure information exchange system according to claim 50, further comprising:
means for classifying the content of the desired information into one or more categories.

52. The secure information exchange system according to claim 51, wherein
the one or more categories are characterized as hierarchical, semantic, conceptual, or polymorphic.

53. The secure information exchange system according to claim 51, further comprising:
means for expanding the one or more categories through application of logic rules.

54. The secure information exchange system according to claim 1, further comprising:
means for classifying an object of the desired information in multiple categories and correspondingly storing the object in multiple compartments of the digital repository by reference.

55. The secure information exchange system according to claim 1, further comprising:
means for removing objects of the desired information that are characterized as redundant, superseded, or expired.

* * * * *

UNITED STATES PATENT AND TRADEMARK OFFICE
CERTIFICATE OF CORRECTION

PATENT NO. : 7,376,652 B2  Page 1 of 1
APPLICATION NO. : 10/464065
DATED : May 20, 2008
INVENTOR(S) : Frederick Hayes-Roth It is certified that error appears in the above-identified patent and that said Letters Patent is hereby corrected as shown below:

Column 1, line 2, "regardless whether" should read --regardless of whether--
Column 1, line 59 "creating" should read --create--
Column 7, line 39, "220" should be changed to --210--
Column 10, line 42, "authorized" should read --authorize--
Column 10, line 47, "Bank Statement" should be corrected to --bank statement--
Column 13, line 66, "these" should be changed to --this--
Claim 1 ,line 25, "to only" should read --only to--
Column 14, line 60, "Cancel Claim 5"
Claim 9, line 12, "the digital" should read --wherein the digital-- and "in network" should read --in a network--
Column 16 , line 33, "Cancel Claim 30"
Column 17, line 5, "having" should be changed to --includes--

Signed and Sealed this

Twenty-second Day of December, 2009

David J. Kappos
*Director of the United States Patent and Trademark Office*